United States Patent
Taniguchi et al.

[11] Patent Number: 5,987,041
[45] Date of Patent: Nov. 16, 1999

[54] LASER APPARATUS AND METHOD FOR EMISSION OF LASER BEAM USING SAME

[75] Inventors: Hirokazu Taniguchi; Kazuyuki Miyake; Masahiro Koto, all of Itami, Japan

[73] Assignee: Mitsubishi Cable Industries, Ltd., Hyogo, Japan

[21] Appl. No.: 09/063,892

[22] Filed: Apr. 22, 1998

[30] Foreign Application Priority Data

Apr. 23, 1997 [JP] Japan ..................... 9-105550

[51] Int. Cl.⁶ ........................................... H01S 3/115
[52] U.S. Cl. ................... 372/12; 372/20; 372/21; 372/22; 372/23; 372/26; 372/28; 372/102; 372/31
[58] Field of Search .................. 372/12, 20, 21, 372/22, 23, 26, 28, 69, 70, 75, 92, 98, 102, 31; 359/328, 326

[56] References Cited

U.S. PATENT DOCUMENTS

| | | | |
|---|---|---|---|
| 4,649,544 | 3/1987 | Haas et al. | 372/22 |
| 5,036,220 | 7/1991 | Byer et al. | 372/22 X |
| 5,247,528 | 9/1993 | Shinozaki et al. | 372/22 |
| 5,452,312 | 9/1995 | Yamamoto et al. | 372/5 |
| 5,504,772 | 4/1996 | Deacon et al. | 372/102 |
| 5,617,435 | 4/1997 | Nagai et al. | 372/22 |
| 5,644,584 | 7/1997 | Nam et al. | 372/20 |
| 5,732,177 | 3/1998 | Deacon et al. | 385/122 |
| 5,768,302 | 6/1998 | Wallace et al. | 372/21 |
| 5,854,870 | 12/1998 | Helmfrid et al. | 385/122 |
| 5,862,163 | 1/1999 | Umezu et al. | 372/21 |

FOREIGN PATENT DOCUMENTS 6-265956   9/1994   Japan ................... 372/12 X

*Primary Examiner*—Brian Healy
*Attorney, Agent, or Firm*—Wenderoth, Lind & Ponack, L.L.P.

[57] ABSTRACT

A laser apparatus capable of emitting a laser beam upon wavelength conversion and intensity modulation, which comprises a fundamental wave resonance means comprising a light emitting part, an optical resonator comprising mirrors sandwiching the light emitting part and capable of laser resonating, and a modulation-conversion means set inside said optical resonator, said light emitting part being a semiconductor light emitting element or a laser medium, said modulation-conversion means converting, by a nonlinear optical effect, a fundamental laser resonance wavelength light, and phase modulating said light by an electro-optical effect, and a modulation part of said modulation-conversion means comprising electrodes for application of a modulation voltage. The laser apparatus of the present invention is compact and has a simple structure as compared to conventional ones, but it is capable of wavelength conversion of the fundamental wave beam by SHG and intensity modulation of this SHG laser beam at a high modulation degree with a low modulation voltage, and emission of the light. The method of use thereof is also very simple and can fulfill the need of a laser apparatus which serves well as a light source for optical communication and the like.

27 Claims, 8 Drawing Sheets

F I G. 1 1
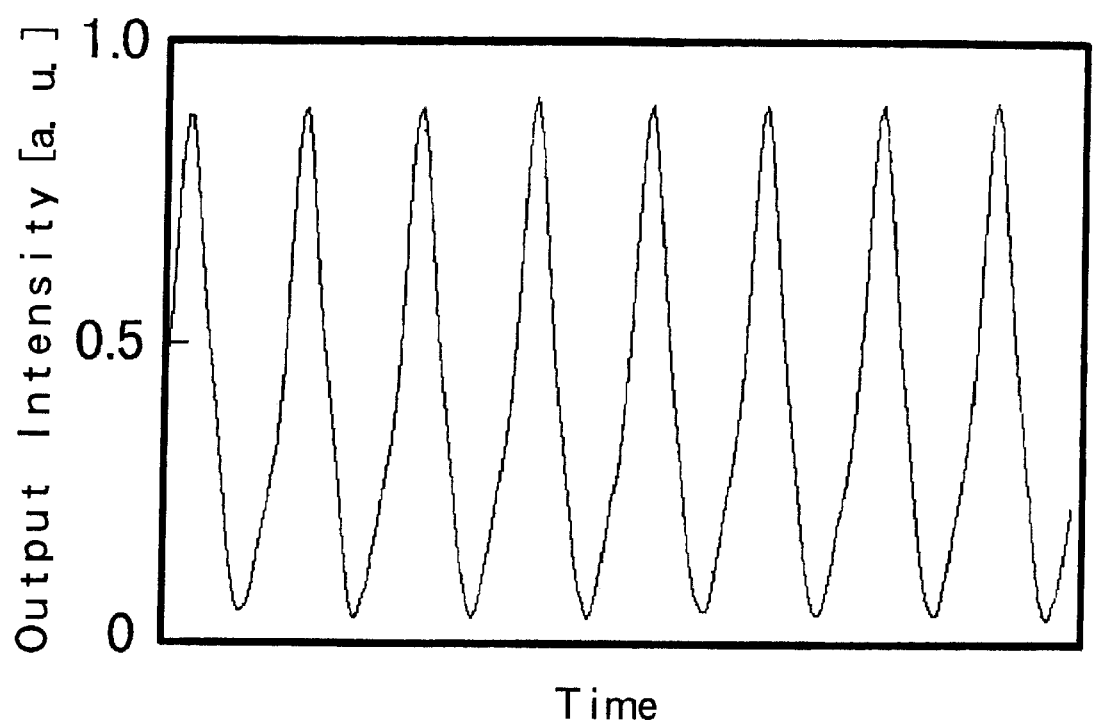

LASER APPARATUS AND METHOD FOR EMISSION OF LASER BEAM USING SAME

FIELD OF THE INVENTION

The present invention relates to a laser apparatus. More particularly, the present invention relates to a laser apparatus capable of emitting a laser beam upon wavelength conversion and intensity modulation, and to a method for emitting a laser beam.

BACKGROUND OF THE INVENTION

A laser beam subjected to intensity modulation, such as a pulsed laser beam subjected to intensity modulation, has been increasingly desired as a light source for optical communication, laser material processing, digital video disk, measurement of distance and shape, and the like.

Conventionally, such laser beam subjected to intensity modulation (hereinafter to be referred to as an intensity modulated light) has been obtained by modulating a laser beam continuously output from a laser diode, laser apparatus having a wavelength conversion function and the like, into pulses by various types of intensity modulators set outside the apparatus.

The conventional intensity modulator set outside the apparatus is generally bulky and expensive. Moreover, since an intensity modulator comprising a wavelength conversion crystal (crystal capable of converting the wavelength of light passing through said crystal) and a voltage application means requires application of a modulation voltage creating an intense electric field of approximately ±2,000–±20,000 V/cm to said crystal for intensity modulation. The need to apply such a high voltage makes miniaturization of a driving power supply and reduction of necessary electric power difficult to achieve. In addition, various protective means against high voltage application may possibly become necessary.

Accordingly, the present invention aims at solving the above-mentioned problems, and to provide a laser apparatus capable of wavelength conversion of a laser beam oscillated in an optical resonator thereof, and effective intensity modulation of said beam, even by the application of modulation voltage of a level lower than the conventional level, as well as emitting a laser beam which underwent wavelength conversion and intensity modulation, and a method for emitting a laser beam.

SUMMARY OF THE INVENTION

The modulation of intensity using a crystal for ordinary wavelength conversion requires application of a high strength electric field to said wavelength conversion crystal as mentioned above. The present inventors have now found that, by setting an ordinary wavelength conversion crystal or a phase modulation crystal (one capable of changing refractive index upon application of a voltage) inside the optical resonator of a laser apparatus, sufficient modulation of intensity can be achieved even when a surprisingly low voltage is applied.

Accordingly, the inventive laser apparatus is characterized by the following. That is, the inventive laser apparatus, capable of emitting a laser beam upon wavelength conversion and intensity modulation, comprises a fundamental wave resonance means comprising a light emitting part, an optical resonator comprising mirrors sandwiching the light emitting part and capable of laser resonating, and a modulation-conversion means set inside said optical resonator, said light emitting part being a semiconductor light emitting element or a laser medium, said modulation-conversion means converting, by a nonlinear optical effect, a fundamental laser resonance wavelength light, and phase modulating said light by an electro-optical effect, and a modulation part of said modulation-conversion means comprising electrodes for application of a modulation voltage.

According to the inventive laser apparatus, a modulation voltage is applied to the modulation part of the above-mentioned modulation-conversion means from the aforesaid electrodes, wherein said modulation voltage produces an electric field of ±1–±1000 V/cm strength.

According to the inventive method for emitting a laser beam, the inventive laser apparatus is used to resonate the fundamental wavelength light by the fundamental wave resonance means of said apparatus, and to apply a modulation voltage to the modulation part of the modulation-conversion means having a phase modulating function, thereby emitting a laser beam which underwent wavelength conversion and intensity modulation. The modulation voltage to be applied may be a voltage producing an electric field of ±1–±1000 V/cm strength.

In the following description, the part of the modulation-conversion means having a wavelength conversion function is to be also referred to as a wavelength conversion part.

By the function of phase modulation by an electro-optical effect is meant a function showing an electro-optical effect; in other words, a function to show different refractive index upon application of a voltage. The phase modulation of fundamental wave is one of the phenomena caused by the variation in the refractive index. The modulation part having a function of phase modulation by electro-optical effect is to be also referred to as a phase modulation part in the following explanation. As mentioned above, it is essential that the phase modulation part should have an electro-optical effect.

In the present invention, the laser medium in the laser apparatus and an optical resonator formed by sandwiching same between mirrors are collectively referred to as a fundamental wave resonance means. A modulation-conversion means having the functions of phase modulation and wavelength conversion of the laser beam oscillated by the fundamental wave resonance means, by the electro-optical effect and nonlinear optical effect, respectively, is set not outside but inside the optical resonator. This structure enables emission, from said laser apparatus, of a laser beam which underwent wavelength conversion and intensity modulation, by merely applying a modulation voltage, by which a less strong electric field of about ±1–±1000 V/cm strength is created, to the part having a phase modulating function. The strength of such electric field thus attained by the present invention is strikingly smaller than the electric field strength of ±2,000–±20,000 V/cm necessary for driving conventional external intensity modulators. What is more, a laser beam modulated in its intensity can be obtained with such a small strength of the electric field.

As mentioned above, the inventive laser apparatus is capable of highly efficient output of a laser beam after wavelength conversion and intensity modulation, by the use of a low modulation voltage which is conventionally insufficient. Combinations of the following factors is considered to be responsible for the effects accomplished by the present invention.

(1) Factor taking note of the changes in the wavelength conversion character of the wavelength conversion part This corresponds to an embodiment wherein a modulation-conversion means is a substance, such as a ferroelectric crystal, simultaneously possessing the functions of wavelength conversion and phase modulation. Supposing the wavelength conversion character of said crystal is expressed by the central wavelength $\lambda c$ and wavelength conversion tolerance $\Delta\lambda$, and said crystal is converting the wavelength of fundamental wave beam (laser beam) within the range of $\Delta\lambda$. When a modulation voltage is applied to said crystal, the refractive index changes due to the electro-optical effect, which in turn influences wavelength conversion function as well. In other words, the wavelength conversion characters ($\lambda c$, $\Delta\lambda$) change with respect to the fundamental wave laser beam, thereby changing the conversion efficiency, and eventually, the intensity of the light subjected to wavelength conversion.

While the attention is paid only to the changes in the wavelength conversion character, the wavelength of the fundamental wave beam also changes, as explained in the following (2).

In addition, when a periodically-poled crystal is used as a substance simultaneously possessing the functions of wavelength conversion and phase modulation, poling period and poling ratio change due to the electro-optical effect afforded by the application of a voltage. When the poling period changes, the central wavelength $\lambda c$ shifts, which ultimately changes the conversion efficiency. When the poling ratio changes, the conversion efficiency is directly changed.

(2) Factor taking note of the changes in the optical resonator character

This includes all embodiments of the present invention, such as an embodiment wherein a single substance simultaneously possesses a wavelength conversion function and a phase modulation function, and an embodiment wherein a wavelength conversion function is possessed by one substance and a phase modulation function is possessed by a different substance. When a modulation voltage is applied to a part in the optical resonator, which has a phase modulation function, the refractive index of said part changes due to the electro-optical effect, and the optical length (=wavelength of fundamental wave beam) of the optical resonator changes. This means that the phase of the fundamental wave beam also changes. As a result, even if the above-mentioned characters ($\lambda c$, $\Delta\lambda$) of the wavelength conversion of a substance do not change, the wavelength of the fundamental wave beam changes. Thus, the conversion efficiency changes and the intensity of the light subjected to wavelength conversion changes.

(3) Factor taking note of the changes in the oscillation character of fundamental wave beam In either of the above-mentioned (1) and (2), when a modulation voltage is applied, the efficiency of the wavelength conversion changes. Conversion of the wavelength of the fundamental wave means a kind of loss for the fundamental wave beam in the optical resonator. On the other hand, the loss of the fundamental wave beam in the optical resonator and a gain of laser balance the stabilization necessary for the oscillation of the fundamental wave beam. Accordingly, changes in the conversion efficiency lead to variation in the loss of the fundamental wave, resulting in disturbance of stabilization necessary for the oscillation of the fundamental wave beam, and a greater change in output power.

The above-mentioned (1) to (3) are the main speculated factors.

The disclosure of Japanese Patent Unexamined Publication No. 6-265956 is explained in the following. This publication discloses a structure seemingly similar to that of the present invention. It should be noted, however, that the invention disclosed in this publication aims at an improved resistance to light to reduce optical damages of the nonlinear optical crystal, which object being different from that of the present invention.

An optical damage refers to resultant changes in the properties of a crystal, which are caused by the exposure of the crystal to a light having a short wavelength that causes changes in the refractive index of the crystal. This is attributable to the occurrence of carrier in the crystal upon application of an optical energy, wherein the carrier increases with growing energy levels, whereby the carrier gathers to a certain part of the crystal to cause changes in the refractive index.

The published invention applies an alternating voltage to avoid said concentration of carrier by diffusing the carrier in the crystal. To achieve a carrier diffusion effect, however, a voltage as high as 4000 V/cm is necessary. In this invention, moreover, a direct voltage may be applied, or the crystal temperature maybe elevated for this purpose. These methods also result in the same diffusion of the carrier. According to this published invention, therefore, the application of an alternating voltage, the application of a direct voltage and heating of the crystal are equally treated as a means which may be taken to achieve the same effect. This in turn means that the invention disclosed in the above-mentioned publication differs greatly from the present invention.

BRIEF DESCRIPTION OF THE DRAWINGS

FIG. 11 is a graph showing the measurement results of the output light obtained by the laser apparatus of Example 2.

DETAILED DESCRIPTION OF THE INVENTION

Figure 1:
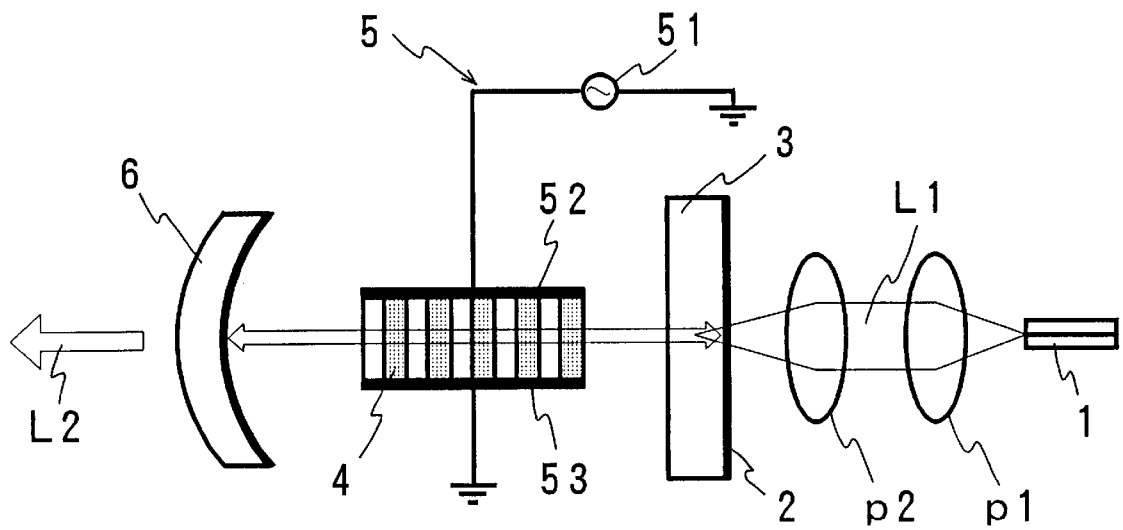
FIG. 1 is a schematic view showing an exemplary structure of the inventive laser apparatus.

The laser apparatus of the present invention comprises a laser medium or a semiconductor light emitting element as a light emitting part. As shown in FIG. 1, a laser medium 3 is exited by an excitation light L1 from the outside and emits light. The semiconductor light emitting element as used herein means one that emits light upon application of a current and has the same structure as that of a semiconductor laser element except an optical resonator. The invention is explained by referring to FIG. 1.

The laser apparatus of the present invention comprises, as a fundamental wave resonance means, this light emitting part and an optical resonator formed by sandwiching said light emitting part between mirrors 2 and 6 in a laser resonatable manner. It further comprises a modulation-conversion means 4 inside the optical resonator. The modulation-conversion means 4 converts, by a nonlinear optical effect, wavelength of a fundamental wave laser beam generated by a fundamental wave resonance means, and modulates the phase thereof by an electro-optical effect. This modulation-conversion means 4 further comprises electrodes 52, 53, thereby enabling application of a modulation voltage by a voltage application means inclusive of said electrodes.

According to the structure shown in FIG. 1, the light emitted from the light emitting part (laser medium 3) is oscillated as a fundamental wave beam by an optical resonator. The wavelength of this laser beam is converted by the wavelength conversion function of the modulation-conversion means 4. This wavelength conversion in the case of, for example, second harmonic generation, is a conversion to a short wavelength. In this case, the phase modulation function of the modulation-conversion means 4 (namely, the function to show electro-optical effect) is responsible for a great influence on the wavelength conversion. The great influence includes, for example, variation in efficiency of wavelength conversion and unattainable wavelength conversion. In addition, the present invention has produced sufficient effect on the amount of the light to be converted at a low modulation voltage which is conventionally ineffective. In other words, it has been made possible to modulate the intensity of the light, upon wavelength conversion, at a modulation voltage lower than the conventional level.

The conventional wavelength conversion laser apparatus generally comprises a fundamental wave resonance means, an optical resonator to work on the oscillated fundamental wave, and a wavelength conversion means. In contrast, the present invention comprises a modulation-conversion means instead of the conventional wavelength conversion means to be set in the optical resonator and a voltage application means capable of applying a modulation voltage (said voltage producing an electric field having a strength of, for example, ±1–±1000 V/cm) to a phase modulation part of said modulation-conversion means.

The fundamental wave resonance means and the optical resonator may be any that are known or put to practical use in the field of conventional wavelength conversion laser apparatus.

For example, the light emitting part of a fundamental wave resonance means is preferably a solid-state laser crystal as a laser medium, which is excited by the excitation light from the outside source and emits light. A semiconductor light emitting element permitting application of a current may be exemplified by the light emitting part of an LD (e.g., laser diode and semiconductor laser element).

The fundamental wave beam which is subject to phase modulation and wavelength conversion in the present invention desirably has a stable wavelength, so that a stable, modulated and converted light can be obtained. Thus, the fundamental wave resonance means preferably comprises a laser medium, which is excited by the excitation light from the outside source and emits light, and an optical resonator, wherein the excitation light source is particularly preferably a semiconductor laser element and the laser medium is particularly preferably a solid-state laser crystal.

The modulation-conversion means modulates the laser beam oscillated by the fundamental wave resonance means by the electro-optical effect, and converts the wavelength thereof by the nonlinear optical effect.

Bulk crystals and periodically-poled crystals of many nonlinear optical materials, such as lithium niobate, lithium tantalate, $KTiOPO_4$ and the like, are materials having a wavelength conversion function due to a nonlinear optical effect, but having a phase modulating function due to an electro-optical effect.

Therefore, the modulation-conversion means to be used in the present invention may comprise only one periodically-poled crystal made from a nonlinear optical material, or two or more periodically-poled crystals linearly aligned in the direction of the beam. In addition, any combination may be used, wherein an electro-optical material having no wavelength conversion function may be used solely as a phase modulation part and a periodically-poled crystal may be used solely as a wavelength conversion part.

The above-mentioned periodically-poled crystal is not limited to one having a single poling period, but may be of a multi-poling period type which comprises two or more parts having different poling periods in one periodically-poled crystal. In addition, the periodic poling may occur at a certain period or at varying periods. The use of a crystal associated with a multi-poling period type wavelength conversion is beneficial in that a number of wavelength converted lights can be emitted, as described in the following by referring to FIG. 5.

The phase modulation part further comprises a voltage application means to apply a modulation voltage. The voltage application means comprises electrodes set in the phase modulation part and an external power source to provide energy to apply a modulation voltage via the electrodes. The modulation voltage to be applied in the present invention may be small to create an electric field of ±1–±1000 V/cm, for the purpose of emitting the light having a modulated intensity according to the present invention.

When electrodes are formed on a periodically-poled crystal, they may be formed over the entirety of the crystal. Alternatively, they may be formed such that an effective voltage is applied only to specific areas having the same polarity. Alternatively, specific areas having different polarities may be selected, and mixed at appropriate ratios according to a desired property, an the voltage may be applied to the selected areas.

Figure 3:
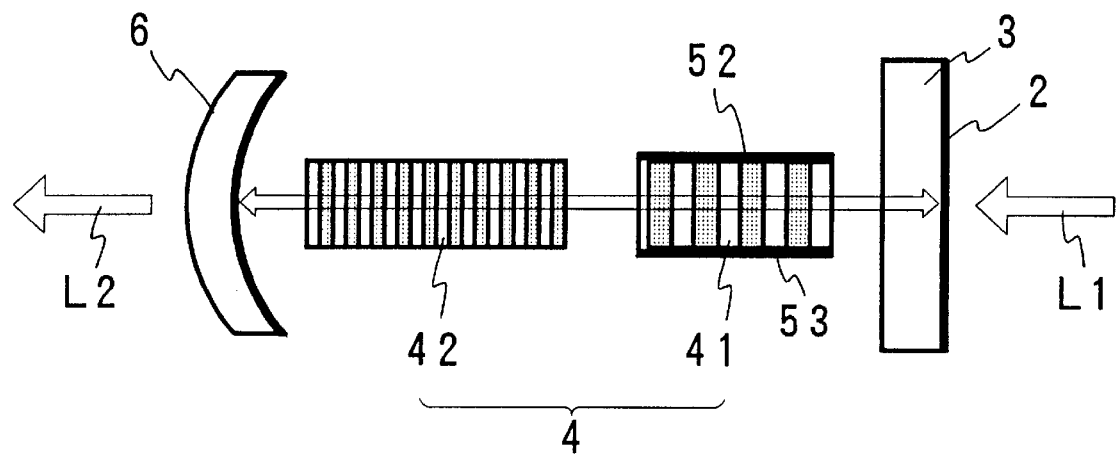
FIG. 3 is a schematic view showing another exemplary structure of the inventive laser apparatus.

When the modulation-conversion means is a crystal, such as a periodically-poled crystal made of a nonlinear optical material, having both the phase modulation function and the wavelength conversion function, electrodes in the voltage application means may be set on at least one part of said crystal, or in the entire length of the crystal, as shown in FIG. 1. When the modulation-conversion means has both a phase modulation part and a wavelength conversion part separately, the electrodes in the voltage application means may be set at the phase modulation part alone, or both said part and wavelength conversion part, as shown in FIG. 3.

Figure 6:
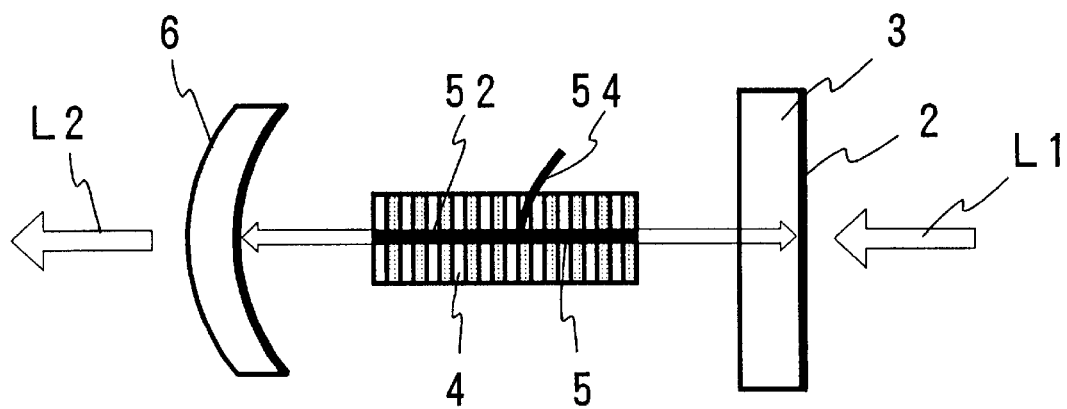
FIG. 6 is a schematic view showing another exemplary structure of the inventive laser apparatus.

A pair of electrodes in the voltage application means are set on the modulation-conversion means, so that the phase of the fundamental wave can be modulated. Said pair of electrodes may be lumped electrodes, as shown in FIG. 6, or traveling wave electrodes, as shown in FIG. 7.

When the electric field created by the application of the modulation voltage applied by a voltage application means is too weak in strength, the degree of intensity modulation decreases. On the other hand, when it is too great, the apparatus becomes bulky by the incorporation of an electric insulation device set in view of high voltage application, which in turn makes the apparatus unbeneficially uneconomical. To avoid this, the electric field created by modulation voltage is of the strength of about ±1–±1000 V/cm, preferably about ±1–±500 V/cm, particularly preferably about ±5–±150 V/cm. While the thickness of the modulation-conversion means (thickness in the direction perpendicular to the optical axis) is free of any particular limitation, it is preferably about 100–2000 μm, particularly preferably about 200–1000 μm.

The phase of the fundamental wave is modulated according to the frequency of the modulation voltage to be applied to the modulation-conversion means. This means that the use of a high frequency modulation voltage results in the phase modulation at a high frequency. According to the present invention, it is also possible to modulate the phase of fundamental wave by the application of a modulation voltage having an ultra-high frequency of $10^6$–$10^{10}$ Hz, in addition to the effect achieved by the above-mentioned low strength electric field. This is another major effect of the present invention that a laser beam can be modulated at such ultra-high frequency to emit light having a modulated intensity and converted wavelength.

Figure 7:
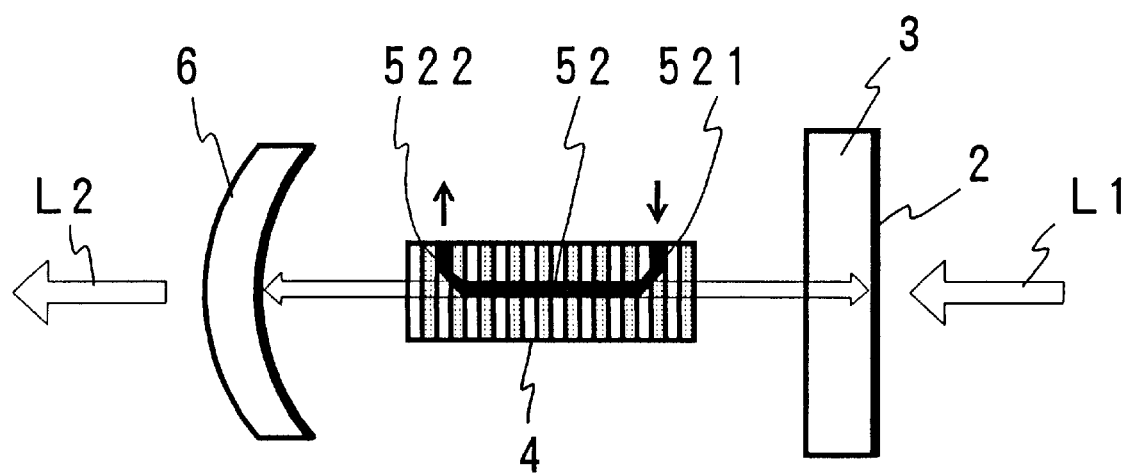
FIG. 7 is a schematic view showing another exemplary structure of the inventive laser apparatus.

The modulation voltage having an ultra-high frequency can be obtained by the use of traveling wave electrodes as shown in FIG. 7.

The laser apparatus of the present invention is described in detail in the following by referring to various embodiments thereof shown in the attached Figures. In all Figures showing the structures of the apparatus, like reference symbols represent like parts in FIG. 1.

In the embodiment shown in FIG. 1, a solid laser apparatus has an external excitation light source 1. As the modulation-conversion means 4, a periodically-poled crystal having both phase modulation function and wavelength conversion function is used. The periodically-poled crystal is a ferroelectric crystal polarized in certain repeats, and is capable of generating second harmonic and wavelength conversion by optical parametric oscillation. In the Figure, electrodes 52, 53 are formed on the entire surfaces of the both top and bottom planes of a modulation-conversion means 4, so that an electric field having a necessary strength acts in the direction perpendicular to the advance direction of the light. In the embodiment shown in FIG. 1, the entire modulation-conversion means 4 shows wavelength conversion and phase modulation functions. Therefore, the electrodes 52, 53 to apply modulation voltage are formed on the entirety of the modulation-conversion means 4. A power source 51 is contained in the voltage application means.

In the embodiment shown in FIG. 1, a semiconductor laser 1 is used as an external excitation light source 1, and an incident light enters a laser medium (solid-state laser crystal) 3 through a collimator lens p1 and a focusing lens p2. On the side of the solid-state laser crystal 3 where an excitation light L1 enters, one of the mirrors of the optical resonator, mirror 2 (entrance side mirror on the excitation light source side) is set. The other mirror of the optical resonator, mirror 6 (exit side mirror on the output side), and the entrance side mirror 2 sandwich the solid-state laser crystal 3 and modulation-conversion means 4 in a laser resonatable manner.

In the embodiment shown in FIG. 1, for example, a periodically-poled crystal having a long side in the direction of the beam may be used to extend the length of the modulation-conversion means 4, thereby enabling output of an ultra-short pulsed light. In addition, by varying the poling period of periodically-poled crystal, various output waves can be obtained. For example, when the poling period of a periodically-poled crystal is successively changed in the direction of light, a broad pulsed light can be emitted.

The wavelength conversion tolerance in the wavelength conversion using a conventional crystal for wavelength conversion is in inverse proportion to the length of said crystal, and a greater crystal length causes less wavelength conversion tolerance. The laser beam incessantly reciprocates between both mirrors in the optical resonator. This means that the beam passes through the wavelength conversion crystal every time it reciprocates. Supposing the length of the wavelength conversion crystal in use to be L, the laser beam in the optical resonator substantially passes through a wavelength conversion crystal having a length of 2L per one reciprocation therein. Repetition of reciprocation causes increase in the effective length of the wavelength conversion crystal which can be expressed by 2L, 4L, 8L and so on, which ultimately gradually decreases the wavelength conversion tolerance of said wavelength conversion crystal to an extremely small level.

The application of a modulation voltage to the part having a phase modulation function based on the electro-optical effect causes variations in the wavelength of the laser beam in the optical resonator according to the frequency of the modulation voltage applied. Therefore, only when the wavelength of said beam is within the narrow wavelength conversion tolerance as mentioned above does the phase matching occur to create second harmonic. Second harmonic is not created in the wavelength other than this range. Consequently, only the specific wavelength of the laser beam is capable of intensity modulation which generates second harmonic.

When a crystal having a long side in the direction of the beam and a concave part on at least one of the planes parallel to the longitudinal direction (direction of beam) is used as a periodically-poled crystal, sufficient intensity modulation can be attained even at a lower electric field strength. The abovementioned concave part may be a slit formed on the side parallel to the direction of the beam. Such slit may be formed adjacent to the beam path in the entire length in the direction of the beam on one or both of the two sides facing each other.

Figure 2:
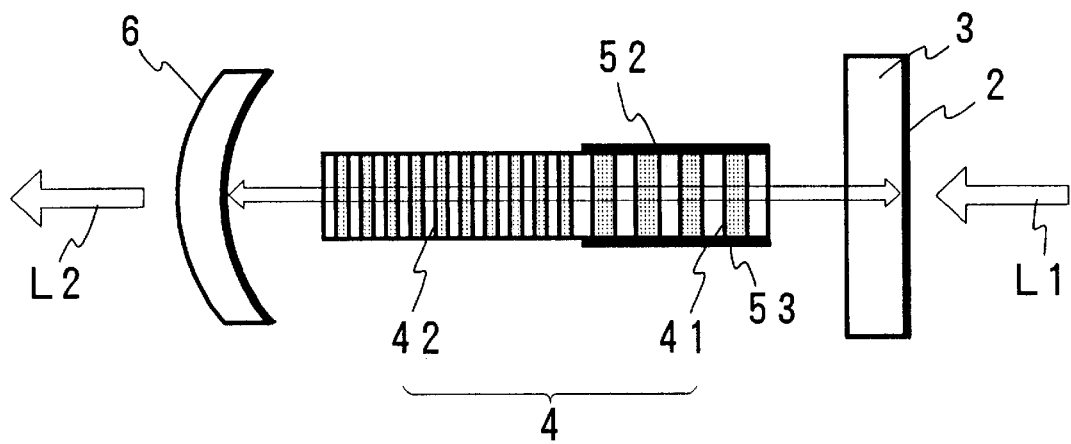
FIG. 2 is a schematic view showing another exemplary structure of the inventive laser apparatus.

In the embodiment shown in FIG. 2, a solid-state laser apparatus is used. As the modulation-conversion means 4, used is a periodically-poled crystal having a long side in the direction of the beam, which is capable of phase modulation and wavelength conversion. It differs from the embodiment shown in FIG. 1 in that half of the entrance side of the modulation-conversion means 4 acts as a phase modulation part (phase modulation crystal) 41, and the other half acts as a wavelength conversion part (wavelength conversion crystal) 42. The electrodes 52, 53 are set only on the phase modulation part 41.

FIG. 3 shows an embodiment similar to the solid-state laser apparatus of FIG. 1. The modulation-conversion means 4 comprises a phase modulation part (phase modulation crystal) 41 and a wavelength conversion part (wavelength conversion crystal) 42 separately formed and disposed linearly at some distance on the optical axis. The phase modulation part 41 may be a bulk crystal or a periodically-poled crystal of lithium niobate and the like. The wavelength conversion part 42 is a periodically-poled crystal. The electrodes 52, 53 are formed on the phase modulation part 41 alone.

Figure 4:
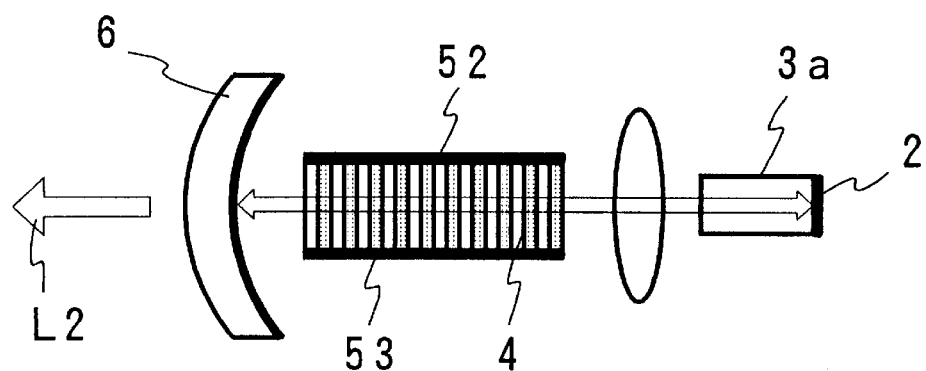
FIG. 4 is a schematic view showing another exemplary structure of the inventive laser apparatus.

In the embodiment shown in FIG. 4, a light emitting part to be formed in the optical resonator is a semiconductor light emitting element 3a, unlike the embodiments in FIGS. 1–3. This semiconductor light emitting element 3a has the same structure as a semiconductor laser element in terms of effective containment of the light and the direction of emission of the light from the element. This element 3a, however, lacks at least one of the two optical resonator mirrors. The missing mirror is separately formed to permit a modulation-conversion means to be set in an optical resonator. In the embodiment shown in FIG. 4, the semiconductor light emitting element 3a comprises only one mirror 2. This mirror 2 and an output side mirror 6 form an optical resonator comprising a modulation-conversion means 4 similar to the one shown in FIG. 1.

Figure 5:
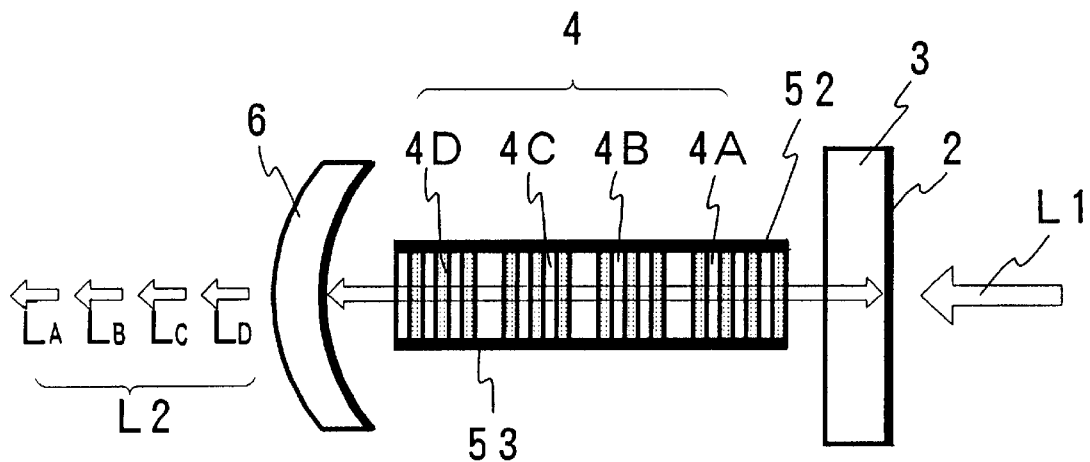
FIG. 5 is a schematic view showing another exemplary structure of the inventive laser apparatus.

In the embodiment shown in FIG. 5, the basic structure of the laser apparatus is the same as in FIG. 1. However, it differs therefrom in that the poling period of the modulation-conversion means 4 is not consistent. To be specific, a periodically-poled crystal is used, which comprises 4A, 4B, 4C and 4D parts having different specific poling periods in a linear succession on the optical axis.

The optical resonator consisting of entrance side mirror 2 and output side mirror 6 encloses the fundamental wave emitted from the solid-state laser crystal 3, but emits laser beams having four kinds of wavelengths, which have been converted by each of 4A–4D parts. This construction permits generation of laser beams $L_A$, $L_B$, $L_C$ and $L_D$, converted to have four kinds of wavelengths and having modulated intensities, as output light L2, by the use of a single modulation-conversion means 4.

In the embodiment shown in FIG. 6, the basic structure of the laser apparatus is the same as in FIG. 1. However, it differs therefrom in that the electrodes formed in the modulation-conversion means 4 are lumped electrodes. Namely, one of the electrodes facing the modulation-conversion means 4 is formed as a stripe electrode 52 on the nearer side of crystal 4 when facing the paper surface of FIG. 6. The other electrode is formed as a broad board electrode extending on the entire surface of the opposite side of crystal 4 when facing the paper surface of FIG. 6 (hidden in the side over the modulation-conversion means 4). A lead 54 is connected to electrode 52. When the electrode 52 is a stripe lumped electrode, an electric field can be concentrated in the part where the fundamental wave beam passes, thus decreasing the necessary modulation voltage and decreasing the static capacity of a phase modulation part, which advantageously facilitates modulation at high frequency.

In the embodiment shown in FIG. 7, the basic structure of the laser apparatus and the direction of the view of the electrodes formed in the modulation-conversion means 4 are the same as in FIG. 6. However, it differs therefrom in that the electrodes are traveling wave electrodes. To be specific, the electrode 52 formed on the nearer side of crystal 4 when facing the paper surface of FIG. 7 has a strip-type transmission line structure. The electrode facing this electrode is formed as a broad board electrode extending on the entire surface of the opposite side of crystal 4 when facing the paper surface of FIG. 7. When such traveling wave electrodes are used, a microwave having a frequency of about 1 GHz–10 GHz is introduced from the entrance 521 of the electrode 52 and exits from the outlet 522. In this way, effective modulation at a frequency of about 1 GHz–10 GHz becomes possible by the application of a modulation voltage having a frequency of about 1 GHz–10 GHz between the both electrodes disposed in an opposite positional relation.

EXAMPLE 1

In this Example, a laser apparatus having the structure of FIG. 1 was actually fabricated. The electrodes were lumped electrodes shown in FIG. 6.

As shown in FIG. 1, the excitation light source was a semiconductor laser element 1 which emitted a 810 nm wavelength laser beam. The solid-state laser crystal 3 was a $YVO_4$ crystal having a thickness in the beam direction of 0.5 mm, and Nd concentration of 3 at %.

An entrance side mirror 2 was formed on one side of the solid-state laser crystal 3 to constitute an optical resonator. A coating was applied to the entrance side mirror 2, which was highly reflective to the fundamental wave beam (1064 nm wavelength beam) but not so to the excitation light (810 mn wavelength beam) L1 from a semiconductor laser element 1. A coating non-reflective to the beam at 1064 mn was applied to the other side of the solid-state laser crystal 3.

A coating was applied to the output side mirror 6, which was highly reflective to a 1064 nm wavelength beam but not reflective to the laser light converted to wavelength 532 nm by second harmonic generation.

A periodically-poled crystal of lithium niobate, which was 5 mm long in the direction of beam, was used as a modulation-conversion means 4 which was set in the beam path in the optical resonator. The periodically-poled crystal had a wavelength conversion tolerance of about 0.1 $\mu$m. The distance between the lumped electrodes formed in the periodically-poled crystal was 300 $\mu$m.

Figure 8:
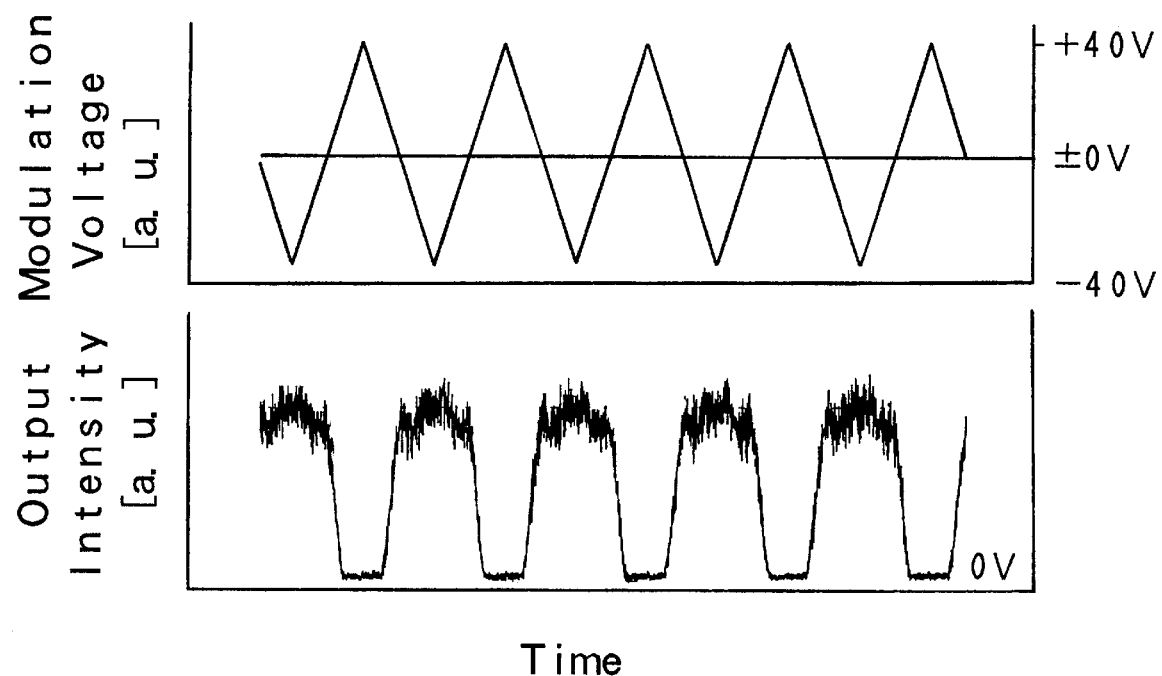
FIG. 8 is a graph showing the voltage (modulation voltage) applied in Example 1 and the measurement results of the output light upon wavelength conversion and intensity modulation.

A laser beam having a wavelength of 810 nm was continuously delivered as an excitation light from a semiconductor laser element 1 and a modulation voltage of 1 kHz and ±40 V was applied to a periodically-poled crystal of lithium niobate. As a result, second harmonic having a wavelength of 532 nm was created as pulses by an electric field having a low strength of about ±20 V, namely, about 650 V/cm, as shown in FIG. 8.

EXAMPLE 2

The embodiment in this example has a structure to improve stability of the output. The basic structure of the laser apparatus is as shown in FIG. 1. The embodiment is shown in FIGS. 9 and 10 with more details.

Figure 9:
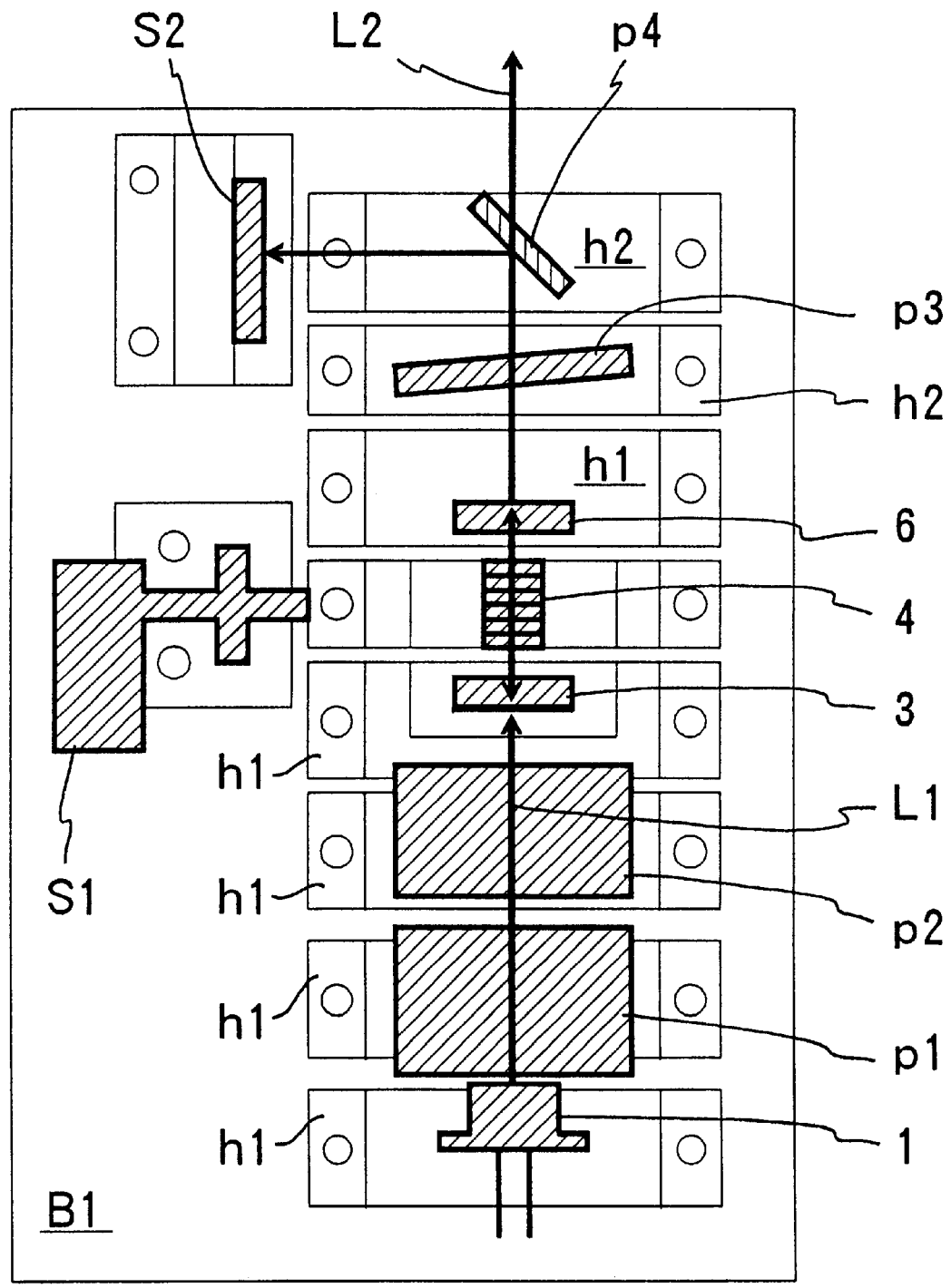
FIG. 9 is a top view showing the structure of the laser apparatus of Example 2.
Figure 10:
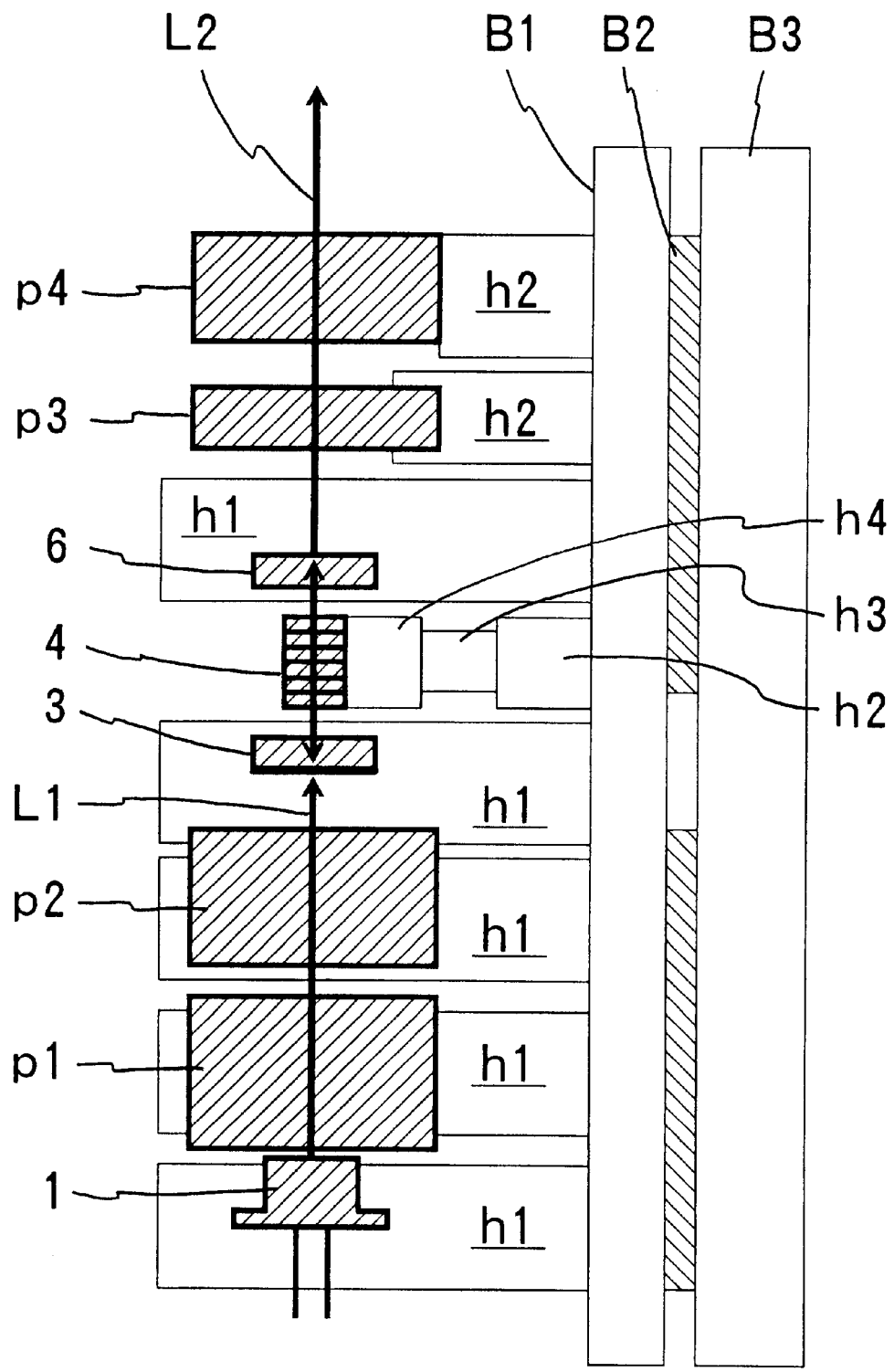
FIG. 10 is a side view of the laser apparatus shown in FIG. 9.

As shown in FIG. 1, FIG. 9 and FIG. 10, a semiconductor laser element 1 having an output power of 150 mW and oscillation wavelength of 810 nm was used as an excitation light source. The excitation light L1 entered the solid-state laser crystal 3 through collimator lens p1 and focusing lens p2. A $YVO_4$ crystal (thickness in the beam direction 0.5 mm) doped with Nd at concentration of 3 at % was used as a solid-state laser crystal 3.

In the same manner as in Example 1, an entrance side mirror 2 was formed on one side of the solid-state laser crystal 3 and non-reflective coating was applied to the other surface. The reflection character of the entrance side mirror 2 and the coating character of the other side were the same as in Example 1.

The output side mirror 6 was a planoconcave mirror made from a synthetic silica, and the concave had a curvature of 50 mm. In the same manner as in Example 1, a coating was applied to the mirror surface, which was highly reflective to 1064 nm wavelength beam and non-reflective to SHG laser light thereof.

As shown in FIG. 10, a support member h1 for each part from the semiconductor laser element 1 to the output side mirror 6 was made from a super invar material having a very small thermal expansion coefficient, to secure the stability to temperature changes in the environment and apparatus itself.

As the modulation-conversion means 4, used was a polarized $LiTaO_3$ crystal (thickness 0.5 mm, length in the beam direction 5 mm). The poling period was set to 7.8 $\mu$m, at which the fundamental wave 1064 nm Of $YVO_4$ laser can be SHG converted. As shown in FIG. 1, electrodes were formed on both top and bottom sides of the crystal, as shown in FIG. 1, which were set in the beam path in the optical resonator.

The above-mentioned crystal was adhered to a brass support h4, which became an electrode, with a conductive adhesive as shown in FIG. 10, to secure electric conductivity in the back surface. In addition, the brass support h4 was adjusted to have a certain temperature with a Peltier element h3 to maintain the crystal at a temperature for phase matching. The support h2 beneath the Peltier element was prepared from aluminum.

For the application of a high frequency modulation voltage to a modulation-conversion means 4 (the aforesaid crystal), a lead wire (earth side) was connected to a brass support h4, a lead wire was connected to the facing electrode (on the upper side in FIG. 10) with a conductive adhesive, these lead wires were connected to a connector S1, and then to a high frequency outside power source (not shown).

As other member of the whole laser apparatus, a filter p3 to remove fundamental wave beam leaked out from the optical resonator was set still outside the output side mirror 6, as shown in FIGS. 9 and 10. In addition, a beam splitter p4 was set on its output side, so that a part of the output laser beam entered photodetector S2. The photodetector S2 was a conversion element to measure the average intensity of the modulated output light. Based on the measurement results by the photodetector S2, the variation in the average intensity of the output light was calculated. A control circuit was formed to feed back control the amount of the current into the excitation light source, so as to minimize the variation thereof, or to stabilize the output light to a certain value, whereby a kind of APC (Auto Power Control) was afforded. It differs from a conventional APC in that the destination of control feed back was the excitation light source. As a consequence, the stability of the apparatus as a whole could be improved, irrespective of the stability of each element.

The parts such as filter p3 and beam splitter p4 were fixed to an aluminum support h2. For the sustained stability of the entire laser, all support members, inclusive of h1 and h2, were fixed on base board B1. Beneath the base board B1 were set two Peltier elements B2 to control the temperature of the entire apparatus from the lower side of base board B1. The base board B1 was made from a super invar material. An aluminum base board B3 was formed under the Peltier element B2.

Operation of Apparatus

The temperature of the Peltier element B2 beneath the base board B1 was set to 25.0° C., and that of the Peltier element h4 beneath the modulation-conversion means 4 (crystal) was set to 46.6° C., within the temperature range required for phase matching, and the apparatus was activated.

First of all, an excitation light entered a solid-state laser crystal 3, from an excitation light source 1, without applying a modulation voltage to the modulation-conversion means 4 to oscillate the fundamental wave beam. The SHG laser beam was emitted from the output side mirror 6. According to the measurement by a photodetector S2, the output power of the SHG laser beam L2 was about 5 mW when that of the excitation light was 150 mW.

Then, a high frequency voltage (80 MHz modulation frequency, 25 Vp-p) was applied between the two electrodes formed in the modulation-conversion means 4. As a result, the intensity of the output SHG laser beam was modulated in accordance with the modulation frequency. The results are shown in the graph of FIG. 11. The results reveal that the inventive apparatus is capable of wavelength conversion of the fundamental wave beam by SHG, and intensity modulation of this SHG laser beam at a high modulation degree with a low modulation voltage.

The laser apparatus of the present invention is compact and has a simple structure as compared to conventional ones. However, it is capable of wavelength conversion of the fundamental wave beam by SHG, intensity modulation of this SHG laser beam at a high modulation degree with a low modulation voltage, and emission of the light. The method of use thereof is also very simple. The present invention can fulfill the need of a laser apparatus which serves well as a light source for optical communication, laser material processing, digital video disk, measurement of distance and shape, and the like.

This application is based on application No. 105550/1997 filed in Japan, the content of which is incorporated hereinto by reference.

What is claimed is:

1. A laser apparatus capable of emitting a laser beam upon wavelength conversion and intensity modulation, which comprises a fundamental wave resonance means comprising a light emitting part, an optical resonator comprising mirrors sandwiching the light emitting part and capable of laser resonating, and a modulation-conversion means set inside said optical resonator, said light emitting part being a semiconductor light emitting element or a laser medium, said modulation-conversion means converting, by a nonlinear optical effect, a fundamental laser resonance wavelength light, and phase modulating said light by an electro-optical effect, and a modulation part of said modulation-conversion means comprising electrodes for application of a modulation voltage.

2. The laser apparatus of claim 1, further comprising a voltage application means capable of applying, via said electrodes, a modulation voltage creating an electric field of ±1–±1000 V/cm in a modulation part of said modulation-conversion means.

3. The laser apparatus of claim 1, wherein the modulation-conversion means is a crystal which modulates phase by an electro-optical effect and converts wavelength by a nonlinear optical effect, and said electrodes are formed on at least a part of said crystal.

4. The laser apparatus of claim 3, wherein said crystal is a periodically-poled crystal.

5. The laser apparatus of claim 4, wherein said periodically-poled crystal is capable of wavelength conversion by second harmonic generation or optical parametric oscillation.

6. The laser apparatus of claim 4, wherein said periodically-poled crystal comprises two or more periodically-poled crystals having different poling periods.

7. The laser apparatus of claim 1, wherein the modulation-conversion means comprises a crystal having a phase modulation function by an electro-optical effect and a crystal having a wavelength conversion function by a nonlinear optical effect, wherein the electrodes are formed on the crystal for the phase modulation.

8. The laser apparatus of claim 7, wherein the phase modulation crystal and the wavelength conversion crystal are periodically-poled crystals.

9. The laser apparatus of claim 8, wherein the wavelength conversion crystal comprises two or more periodically-poled crystals having different poling periods.

10. The laser apparatus of claim 1, wherein the electrodes are lumped electrodes or traveling wave electrodes.

11. The laser apparatus of claim 1, further comprising an excitation light source, a photodetector and a control part, wherein said light emitting part is a laser medium which is excited by a light from an excitation light source to emit light, said photodetector receiving a part of the laser beam subjected to wavelength conversion and intensity modulation, and emitted from said laser apparatus, and measuring an average intensity thereof, and said control part controlling the output power of the excitation light source based on said measurement results, so that variations in the output power of said apparatus can be minimized.

12. The laser apparatus of claim 11, wherein the excitation light source, the laser medium, the modulation-conversion means, the optical resonator, the photodetector and the optical system disposed among them are formed on one base board.

13. The laser apparatus of claim 12, wherein the excitation light source, the laser medium, the modulation-conversion means, and the optical resonator are formed on said base board via a support made from a super invar material.

14. A method for emitting a laser beam upon wavelength conversion and intensity modulation, by the use of the laser apparatus of claim 1, comprising the steps of
   (a) laser resonating a fundamental wavelength light by a fundamental wave resonance means of said apparatus, and
   (b) applying a modulation voltage to a modulation part of the modulation-conversion means of said apparatus, which has a phase modulating function.

15. The method of claim 14, wherein the modulation voltage to be applied creates an electric field of ±1–±1000 V/cm in the modulation part.

16. A method for emitting a laser beam upon wavelength conversion and intensity modulation, by the use of the laser apparatus of claim 2, comprising the steps of
   (a) laser resonating a fundamental wavelength light by a fundamental wave resonance means of said apparatus, and
   (b) applying a modulation voltage to a modulation part of the modulation-conversion means of said apparatus, which has a phase modulating function.

17. A method for emitting a laser beam upon wavelength conversion and intensity modulation, by the use of the laser apparatus of claim 3, comprising the steps of
   (a) laser resonating a fundamental wavelength light by a fundamental wave resonance means of said apparatus, and
   (b) applying a modulation voltage to a modulation part of the modulation-conversion means of said apparatus, which has a phase modulating function.

18. A method for emitting a laser beam upon wavelength conversion and intensity modulation, by the use of the laser apparatus of claim 4, comprising the steps of
   (a) laser resonating a fundamental wavelength light by a fundamental wave resonance means of said apparatus, and
   (b) applying a modulation voltage to a modulation part of the modulation-conversion means of said apparatus, which has a phase modulating function.

19. A method for emitting a laser beam upon wavelength conversion and intensity modulation, by the use of the laser apparatus of claim 5, comprising the steps of
   (a) laser resonating a fundamental wavelength light by a fundamental wave resonance means of said apparatus, and
   (b) applying a modulation voltage to a modulation part of the modulation-conversion means of said apparatus, which has a phase modulating function.

20. A method for emitting a laser beam upon wavelength conversion and intensity modulation, by the use of the laser apparatus of claim 6, comprising the steps of
   (a) laser resonating a fundamental wavelength light by a fundamental wave resonance means of said apparatus, and
   (b) applying a modulation voltage to a modulation part of the modulation-conversion means of said apparatus, which has a phase modulating function.

21. A method for emitting a laser beam upon wavelength conversion and intensity modulation, by the use of the laser apparatus of claim 7, comprising the steps of
   (a) laser resonating a fundamental wavelength light by a fundamental wave resonance means of said apparatus, and
   (b) applying a modulation voltage to a modulation part of the modulation-conversion means of said apparatus, which has a phase modulating function.

22. A method for emitting a laser beam upon wavelength conversion and intensity modulation, by the use of the laser apparatus of claim 8, comprising the steps of
   (a) laser resonating a fundamental wavelength light by a fundamental wave resonance means of said apparatus, and
   (b) applying a modulation voltage to a modulation part of the modulation-conversion means of said apparatus, which has a phase modulating function.

23. A method for emitting a laser beam upon wavelength conversion and intensity modulation, by the use of the laser apparatus of claim 9, comprising the steps of
   (a) laser resonating a fundamental wavelength light by a fundamental wave resonance means of said apparatus, and
   (b) applying a modulation voltage to a modulation part of the modulation-conversion means of said apparatus, which has a phase modulating function.

24. A method for emitting a laser beam upon wavelength conversion and intensity modulation, by the use of the laser apparatus of claim 10, comprising the steps of
   (a) laser resonating a fundamental wavelength light by a fundamental wave resonance means of said apparatus, and
   (b) applying a modulation voltage to a modulation part of the modulation-conversion means of said apparatus, which has a phase modulating function.

25. A method for emitting a laser beam upon wavelength conversion and intensity modulation, by the use of the laser apparatus of claim 11, comprising the steps of
   (a) laser resonating a fundamental wavelength light by a fundamental wave resonance means of said apparatus, and
   (b) applying a modulation voltage to a modulation part of the modulation-conversion means of said apparatus, which has a phase modulating function.

26. A method for emitting a laser beam upon wavelength conversion and intensity modulation, by the use of the laser apparatus of claim 12, comprising the steps of
   (a) laser resonating a fundamental wavelength light by a fundamental wave resonance means of said apparatus, and (b) applying a modulation voltage to a modulation part of the modulation-conversion means of said apparatus, which has a phase modulating function.

27. A method for emitting a laser beam upon wavelength conversion and intensity modulation, by the use of the laser apparatus of claim 13, comprising the steps of (a) laser resonating a fundamental wavelength light by a fundamental wave resonance means of said apparatus, and
(b) applying a modulation voltage to a modulation part of the modulation-conversion means of said apparatus, which has a phase modulating function.

* * * * *